United States Patent
Hada et al.

(10) Patent No.: US 11,305,395 B2
(45) Date of Patent: Apr. 19, 2022

(54) THERMAL DISPLACEMENT COMPENSATION SYSTEM

(71) Applicant: FANUC CORPORATION, Yamanashi (JP)

(72) Inventors: Keita Hada, Yamanashi (JP); Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 293 days.

(21) Appl. No.: 16/143,467

(22) Filed: Sep. 27, 2018

(65) Prior Publication Data

US 2019/0099850 A1 Apr. 4, 2019

(30) Foreign Application Priority Data

Oct. 4, 2017 (JP) .............................. JP2017-194041

(51) Int. Cl.
*B23Q 15/18* (2006.01)
*B23Q 11/00* (2006.01)
*G05B 19/404* (2006.01)

(52) U.S. Cl.
CPC .......... *B23Q 15/18* (2013.01); *B23Q 11/0007* (2013.01); *G05B 19/404* (2013.01); *B23Q 2220/006* (2013.01); *G05B 2219/49206* (2013.01); *G05B 2219/49219* (2013.01)

(58) Field of Classification Search
None
See application file for complete search history.

(56) References Cited

U.S. PATENT DOCUMENTS

| | | | |
|---|---|---|---|
| 9,092,025 B2 * | 7/2015 | Maekawa | B23Q 11/0007 |
| 10,353,373 B2 | 7/2019 | Suzuki et al. | |
| 2002/0038189 A1 | 3/2002 | Mizuguchi et al. | |

(Continued)

FOREIGN PATENT DOCUMENTS

| | | |
|---|---|---|
| CN | 102528558 A | 7/2012 |
| CN | 103153534 A | 6/2013 |

(Continued)

OTHER PUBLICATIONS

Dialog, Machine translation of JP 5969676 B1, The tool of the machine tool, the frequency of the mechanical correcting machine learning method and device for learning, the learning machine and machine tool provided with the device, Downloaded Sep. 4, 2020 (Year: 2020).*

(Continued)

*Primary Examiner* — Eman A Alkafawi
*Assistant Examiner* — Denise R Karavias
(74) *Attorney, Agent, or Firm* — Hauptman Ham, LLP

(57) ABSTRACT

A thermal displacement compensation system detects a state quantity indicating a state of a machine, infers a thermal displacement compensation amount of the machine from the detected state quantity, and performs a thermal displacement compensation of the machine based on the inferred thermal displacement compensation amount of the machine. The thermal displacement compensation system generates a learning model by machine learning that uses a feature quantity, and stores the generated learning model in association with a combination of specified conditions of individual difference of the machine.

14 Claims, 12 Drawing Sheets

(56) References Cited

U.S. PATENT DOCUMENTS

| | | | |
|---|---|---|---|
| 2008/0215178 | A1 | 9/2008 | Senda |
| 2012/0123586 | A1 | 5/2012 | Maekawa et al. |
| 2013/0116851 | A1* | 5/2013 | Sasaki ............... G06F 1/206 700/299 |
| 2013/0223946 | A1* | 8/2013 | Yamamoto ......... B23Q 15/18 409/80 |
| 2013/0325164 | A1 | 12/2013 | Wwatanabe et al. |
| 2014/0074299 | A1 | 3/2014 | Endou et al. |
| 2014/0379117 | A1 | 12/2014 | Nishimura |
| 2015/0276633 | A1 | 10/2015 | Koyama et al. |
| 2015/0286208 | A1 | 10/2015 | Endou et al. |
| 2016/0224010 | A1* | 8/2016 | Qi ..................... G05B 19/404 |
| 2017/0023417 | A1 | 1/2017 | Koyama |
| 2017/0039487 | A1* | 2/2017 | Naganuma ......... G06N 20/00 |
| 2017/0091667 | A1* | 3/2017 | Yukawa ............. G06N 3/0427 |
| 2018/0356282 | A1 | 12/2018 | Fukuda et al. |

FOREIGN PATENT DOCUMENTS

| | | |
|---|---|---|
| CN | 103659461 A | 3/2014 |
| CN | 104227498 A | 12/2014 |
| CN | 104942651 A | 9/2015 |
| CN | 104972360 A | 10/2015 |
| CN | 105843167 A | 8/2016 |
| CN | 106371404 A | 2/2017 |
| CN | 106488828 A | 3/2017 |
| EP | 1189122 A2 | 3/2002 |
| JP | H11-114776 A | 4/1999 |
| JP | 2002-86329 A | 3/2002 |
| JP | 2003-94291 A | 4/2003 |
| JP | 200430421 A | 1/2004 |
| JP | 2006-55919 A | 3/2006 |
| JP | 2008-183653 A | 8/2008 |
| JP | 2015-30083 A | 2/2015 |
| JP | 2017-120622 A | 7/2017 |
| WO | 2012/114493 A1 | 8/2012 |

OTHER PUBLICATIONS

Search machine translation, Li et al., CN 101797704 B, "Numerical Control Gear Hobbing Machine Thermal Deformation Error Compensation Method," Oct. 30, 2013 (Year: 2013).*

Espacenet machine translation, Kawai Hedetsugu, JP2005202844A, Numerical Controller, Jul. 28, 2005 (Year: 2005).*

Search machine translation, Kyoichi et al., JP 2003094291 "Thermal Displacement Correction Method and Device for Machine," Apr. 3, 2003 (Year: 2003).*

Espacenet machine translation, Matsuno Osamu, JP2003340681A, "Machine tool," Dec. 2, 2003 (Year: 2003).*

Espacenet machine translation, Kawai Hidetsugu, JP2005202844A, "Numerical Controller," Jul. 28, 2005 (Year: 2005).*

* cited by examiner

FIG.2

| LOT NUMBER | FREQUENCY OF USE | CUMULATIVE OPERATING TIME | MAINTENANCE HISTORY | MODIFICATION HISTORY |
|---|---|---|---|---|
| FAWA000001 | 28 HOURS/WEEK | 1526 HOURS | SPINDLE: 471/1000 HOURS<br>FEED AXIS: 1310/1000 HOURS | FEED AXIS: BS-001 |
| FAWA001034 | 14 HOURS/WEEK | 511 HOURS | SPINDLE: 511/1000 HOURS<br>FEED AXIS: 511/1000 HOURS | NONE |
| GS002542 | 85 HOURS/WEEK | 3199 HOURS | SPINDLE: 102/1000 HOURS<br>FEED AXIS: 1851/1000 HOURS | NONE |
| ⋮ | ⋮ | ⋮ | ⋮ | ⋮ |

FIG.3

| LOT NUMBER | FREQUENCY OF USE | CUMULATIVE OPERATING TIME | MAINTENANCE HISTORY | MODIFICATION HISTORY |
|---|---|---|---|---|
| FAWA000001~000100 | 0 TO 100 HOURS/WEEK | 0 TO 10000 HOURS | SPINDLE: 0 TO 500;··· | NONE |
| FAWA000001~000100 | 0 TO 100 HOURS/WEEK | 10000 OR MORE HOURS | SPINDLE: 0 TO 500;··· | NONE |
| FAWA000001~000100 | 101 HOURS OR MORE/WEEK | 0 TO 10000 HOURS | SPINDLE: 0 TO 500;··· | NONE |
| FAWA000001~000100 | 101 HOURS OR MORE/WEEK | 10000 OR MORE HOURS | SPINDLE: 0 TO 500;··· | NONE |
| ⋮ | ⋮ | ⋮ | ⋮ | ⋮ |
| GS000001~001000 | 0 TO 50 HOURS/WEEK | 0 TO 10000 HOURS | SPINDLE: 0 TO 500;··· | NONE |
| GS000001~001000 | 0 TO 50 HOURS/WEEK | 0 TO 10000 HOURS | SPINDLE: 0 TO 500;··· | NONE |
| GS001001~002500 | 51 HOURS OR MORE/WEEK | 0 TO 10000 HOURS | SPINDLE: 0 TO 500;··· | NONE |
| ⋮ | ⋮ | ⋮ | ⋮ | ⋮ |

THERMAL DISPLACEMENT COMPENSATION SYSTEM

RELATED APPLICATIONS

The present application claims priority of Japanese Patent Application No. 2017-194041, filed on Oct. 4, 2017, the disclosure of which is hereby incorporated by reference herein in its entirety.

BACKGROUND OF THE INVENTION

1. Field of the Invention

The present invention relates to a thermal displacement compensation system and, particularly, to a thermal displacement compensation system which performs a compensation while switching learning models in accordance with individual difference of a machine in a factory.

2. Description of the Related Art

In a machine, since a feed screw and a spindle are driven by a motor, the feed screw and the spindle expand and a machine position changes due to heat generated by the motor, frictional heat created by a rotation of a bearing, and frictional heat in a contact portion between a ball screw and a ball nut of the feed screw. In addition, since a change in ambient temperature of the machine and the use of a coolant also cause a change in column and bed temperatures, the machine position changes due to elongation or inclination induced by such a temperature change. In other words, a deviation occurs in a relative positional relationship between a workpiece to be positioned and a tool. Such a change in the machine position due to heat becomes an issue when performing machining with high accuracy.

In order to eliminate such a displacement in a machine position due to heat, a technique for compensating a command position using a displacement sensor, a technique for compensating a command position by predicting a thermal displacement from operating conditions such as the number of rotations of a spindle, and a structure which circumvents the effect of thermal expansion by imparting an initial tension to a feed screw have been used (refer to Japanese Patent Application Laid-open No. 2002-086329, Japanese Patent Application Laid-open. No. 2006-055919, and Japanese Patent Application Laid-open No. 2008-183653).

However, a state of a thermal displacement of a machine changes significantly not only in accordance with an operating state of the machine itself but also in accordance with an individual difference of the machine. For example, a state of a thermal displacement of a machine may differ depending on a production lot, a frequency of use, a cumulative operating time, maintenance/modification history, and the like of the machine even if the operating state is the same. Therefore, it is essential to take individual difference of a machine into consideration in order to perform a thermal displacement compensation of the machine in an appropriate manner.

While a machine learning device which takes an operating state and individual difference of a machine into consideration may conceivably be introduced in order to perform a thermal displacement compensation of the machine, creating a general-purpose machine learning device (a general-purpose learning model) capable of accommodating a wide variety of situations as described above requires a large volume of state information detected in various situations and, in addition, known problems such as over-learning may occur due to the necessity of many parameters including data related to such various situations.

SUMMARY OF THE INVENTION

In consideration thereof, an object of the present invention is to provide a thermal displacement compensation system that enables appropriate thermal displacement compensation to be performed which takes individual difference of a machine into consideration.

The thermal displacement compensation system according to the present invention solves the problem described above by providing a mechanism for switching learning models used to determine thermal displacement compensation of a machine in a factory in accordance with individual difference of the machine. The thermal displacement compensation system according to the present invention has a plurality of learning models, selects a learning model in accordance with individual difference or the like of a machine in a factory, performs machine learning based on a state quantity detected from the machine with respect to the selected learning model, and performs a thermal displacement compensation of the machine in a factory by selectively using learning models created in this manner in accordance with individual difference or the like of the machine.

A thermal displacement compensation system according to an aspect of the present invention performs a thermal displacement compensation of a machine, the thermal displacement compensation system including: a condition specifying section which specifies a condition of individual difference of the machine; a state quantity detecting section which detects a state quantity indicating a state of the machine; an inferential calculation section which infers a thermal displacement compensation amount of the machine from the state quantity; a compensation executing section which performs a thermal displacement compensation of the machine based on the thermal displacement compensation amount of the machine inferred by the inferential calculation section; a learning model generating section which generates or updates a learning model by machine learning that uses the state quantity; and a learning model storage section which stores at least one learning model generated by the learning model generating section in association with a combination of conditions specified by the condition specifying section. In addition, the inferential calculation section infers the thermal displacement compensation amount of the machine by selectively using, based on a condition of individual difference of the machine specified by the condition specifying section, at least one learning model from the learning models stored in the learning model storage section.

The thermal displacement compensation system may further include a feature quantity creating section which creates a feature quantity characterizing a thermal state of the machine, from the state quantity detected by the state quantity detecting section, wherein the inferential calculation section may infer the thermal displacement compensation amount of the machine from the feature quantity, and the learning model generating section may generate or update a learning model by machine learning that uses the feature quantity.

The learning model generating section may generate a new learning model by performing a modification of an existing learning model stored in the learning model storage section.

The learning model storage section may encrypt and store a learning model generated by the learning model generating section and decrypt the encrypted learning model when a learning model is read by the inferential calculation section.

A thermal displacement compensation system according to another aspect of the present invention performs a thermal displacement compensation of a machine, the thermal displacement compensation system including: a condition specifying section which specifies a condition of individual difference of the machine; a state quantity detecting section which detects a state quantity indicating a state of the machine; an inferential calculation section which infers a thermal displacement compensation amount of the machine from the state quantity; a compensation executing section which performs a thermal displacement compensation of the machine based on the thermal displacement compensation amount of the machine inferred by the inferential calculation section; and a learning model storage section which stores at least one learning model associated in advance with a combination of operations of the machine. In addition, the inferential calculation section infers the thermal displacement compensation amount of the machine by selectively using, based on a condition of individual difference of the machine specified by the condition specifying section, at least one learning model from the learning models stored in the learning model storage section.

The thermal displacement compensation system may further include a feature quantity creating section which creates a feature quantity characterizing a thermal state of the machine, from the state quantity detected by the state quantity detecting section, and the inferential calculation section may infer the thermal displacement compensation amount of the machine from the feature quantity.

A numerical controller according to an aspect of the present invention includes the condition specifying section and the state quantity detecting section which are described above.

A thermal displacement compensation method according to an aspect of the present invention includes the steps of specifying a condition of individual difference of a machine; detecting a state quantity indicating a state of the machine; inferring a thermal displacement compensation amount of the machine from the state quantity; performing a thermal displacement compensation of the machine based on the thermal displacement compensation amount; and generating or updating a learning model by machine learning that uses the state quantity. In addition, in the inferring step, a learning model to be used based on the condition specified in the condition specifying step may be selected from at least one learning model associated in advance with a combination of operation conditions of the machine, and the thermal displacement compensation amount of the machine may be inferred using the selected learning model.

The thermal displacement compensation method may further include a step of creating a feature quantity characterizing a thermal state of the machine, from the state quantity, wherein in the inferring step, the thermal displacement compensation amount of the machine may be inferred from the feature quantity, and in the step of generating or updating a learning model, a learning model may be generated or updated by machine learning that uses the feature quantity.

A thermal displacement compensation method according to another aspect of the present invention includes the steps of: specifying a condition of individual difference of a machine; detecting a state quantity indicating a state of the machine; inferring a thermal displacement compensation amount of the machine from the state quantity; and performing a thermal displacement compensation of the machine based on the thermal displacement compensation amount. In addition, in the inferring step, a learning model to be used based on the condition specified in the condition specifying step is selected from at least one learning model associated in advance with a combination of conditions of individual difference of the machine, and the thermal displacement compensation amount of the machine is inferred using the selected learning model.

The thermal displacement compensation method may further execute a step of creating a feature quantity characterizing a thermal state due to individual difference of the machine, from the state quantity, wherein in the inferring step, the thermal displacement compensation amount of the machine may be inferred from the feature quantity.

A learning model set according to an aspect of the present invention is a learning model set formed by associating each of a plurality of learning models with a combination of conditions under which a thermal displacement compensation of a machine is to be performed, wherein each of the plurality of learning models is a learning model generated or updated based on a state quantity indicating a state of the machine under a condition of individual difference of the machine. In addition, one learning model is selected based on the condition of individual difference of the machine from the plurality of learning models, and the selected learning model is to be used in processing for inferring a thermal displacement compensation amount of the machine.

According to the present invention, since machine learning can be performed based on a state quantity of a machine in a factory detected in each situation with respect to a learning model selected in accordance with individual difference of the machine, highly efficient machine learning can be performed while preventing over--learning, and since a thermal displacement compensation of a machine using a learning model selected in accordance with individual difference or the like of the machine is performed, accuracy of thermal displacement compensation of the machine improves.

BRIEF DESCRIPTION OF THE DRAWINGS

FIG. 2 is a diagram illustrating conditions of individual difference of a machine;

FIG. 3 is a diagram illustrating a classification of conditions of individual difference of a machine;

DETAILED DESCRIPTION OF THE PREFERRED EMBODIMENTS

Figure 1:
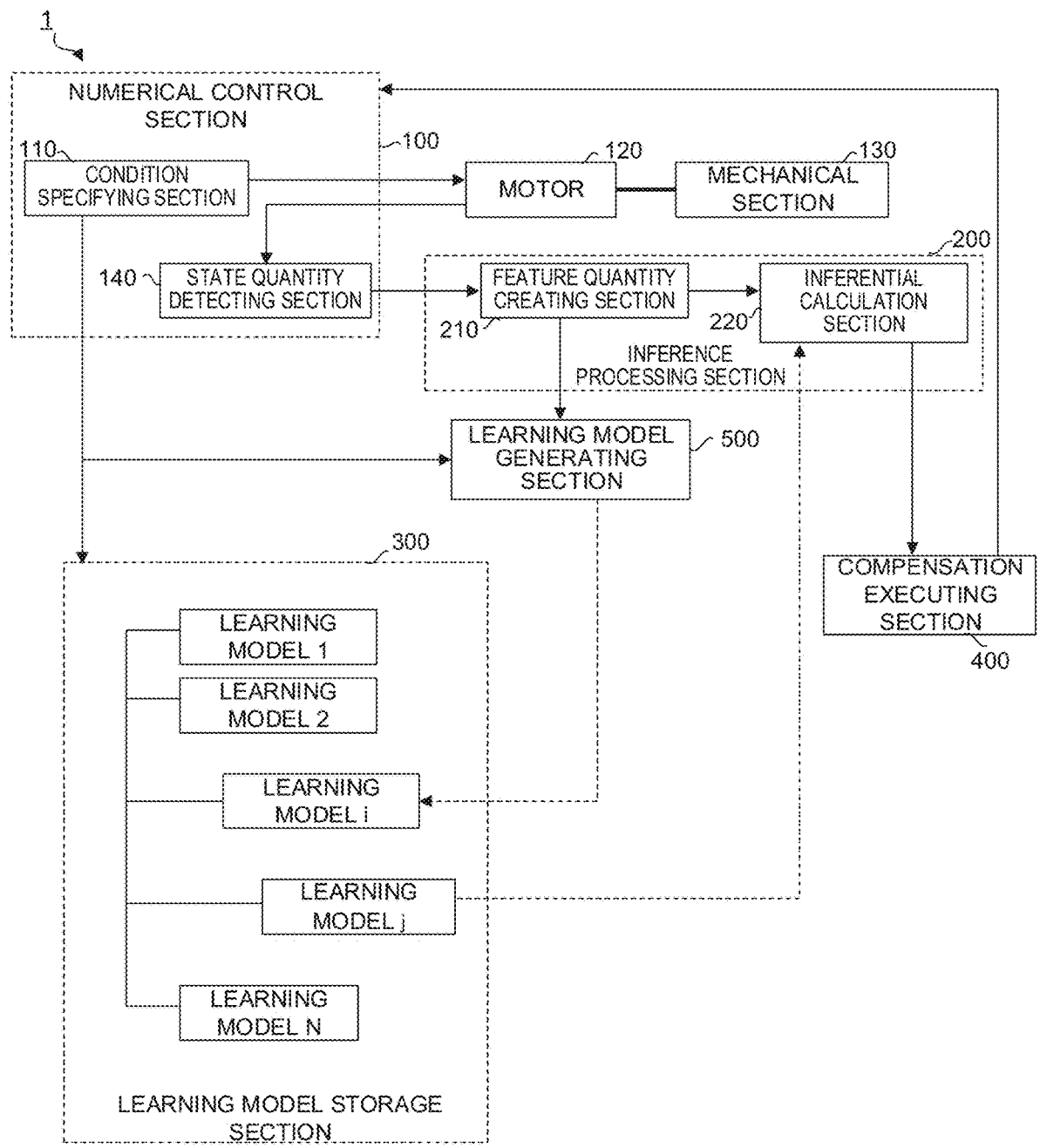
FIG. 1 is a schematic functional block diagram of a thermal displacement compensation system according to a first embodiment.

FIG. 1 is a schematic functional block diagram of a thermal displacement compensation system 1 according to a first embodiment.

The respective functional blocks shown in FIG. 1 are implemented as a processor such as a CPU or a GPU provided in a computer such as a numerical controller, a cell computer, a host computer, or a cloud server controls operations of various parts of an apparatus in accordance with each system program.

The thermal displacement compensation system 1 according to the present embodiment includes a numerical control section 100 as an edge device, an inference processing section 200, and a learning model storage section 300. The numerical control section 100 serves as at least an object of observation/inference of a state. The performs inference with respect to a state of the edge device. The learning model storage section 300 stores and manages a plurality of learning models. The thermal displacement compensation system 1 according to the present embodiment further includes a compensation executing section 400 and a learning model generating section 500. The compensation executing section 400 performs a thermal displacement compensation based on a result of an inference by the inference processing section 200 with respect to the state of the edge device. The learning model generating section 500 creates and updates a learning model stored in the learning model storage section 300.

The numerical control section 100 according to the present embodiment controls a machine by executing blocks of a work program stored in a memory (not shown). The numerical control section 100 is implemented as, for example, a numerical controller, sequentially reads and analyzes blocks of the work program stored in the memory (not shown), calculates an amount of movement of a motor 120 per control period based on a result of the analysis, and controls the motor 120 in accordance with the calculated amount of movement per control period. The machine controlled by the numerical control section 100 includes a mechanical section 130 driven by the motor 120, and when the mechanical section 130 is driven, for example, a tool and a workpiece move relative to each other and the workpiece is machined. Moreover, while omitted in FIG. 1, as many motors 120 as the number of axes provided in the mechanical section 130 of a machine tool are provided.

A condition specifying section 110 provided in the numerical control section 100 specifies a condition of individual difference of the machine controlled by the numerical control section 100. Examples of a condition of individual difference include a production lot, a frequency of use, a cumulative operating time, and maintenance/modification history of the machine. The condition specifying section 110 specifies (outputs) a condition set to the numerical control section 100 via an input device (not shown) by a worker, a condition acquired by the numerical control section 100 from the machine, a condition acquired by the numerical control section 100 via a network, a condition commanded by the work program, and the like with respect to each section of the numerical control section 100 as necessary and, at the same time, specifies (outputs) the conditions to the learning model storage section 300 and the learning model generating section 500. The condition specifying section 110 has a role of notifying each section of the thermal displacement compensation system 1 of a condition in a current machining operation of the numerical control section 100, as an edge device as a condition of selecting a learning model.

For example, as shown in FIG. 2, a condition of individual difference of the machine control led by the numerical control section 100 may be expressed by a combination of items including a production lot, a frequency of use, a cumulative operating time, a maintenance history (which can be represented by a set of an elapsed time from a previous maintenance and a frequency of maintenance for each portion of a machine of which maintenance is to be performed), and a modification history (which can be represented by a custom-ordered component introduced with respect to a modified portion of the machine) of the machine. In addition, any item other than those described above may be adopted as long as the item indicates individual difference which significantly affects thermal displacement.

A state quantity detecting section 140 provided in the numerical control section 100 detects a state of the machine controlled by the numerical control section 100 as a state quantity. Examples of a state quantity of the machine controlled by the numerical control section 100 include ambient temperature of the machine, temperature of each location in the machine, and an operation of a spindle, a feed axis, or the like of the machine. For example, the state quantity detecting section 140 detects, as a state quantity, a value of a current flowing through the numerical control section 100 or the motor 120 driving the mechanical section 130 of a machine tool controlled by the numerical control section 100 or a detection value detected by a device such as a sensor separately provided in each section. The state quantity detected by the state quantity detecting section 140 is output to the inference processing section 200 and the learning model generating section 500.

The inference processing section 200 according to the present embodiment observes a state of the numerical control section 100 as an edge device (and the machine controlled by the numerical control section 100) and infers a thermal displacement compensation amount of each axis of the machine controlled by the numerical control section 100 based on a result of the observation. For example, the inference processing section 200 can be implemented as a numerical controller, a cell computer, a host computer, a cloud server, a machine learning apparatus, or the like.

A feature quantity creating section 210 provided in the inference processing section 200 creates a feature quantity indicating characteristics of a thermal state of the machine controlled by the numerical control section 100 based on the state quantity detected by the state quantity detecting section 140. The feature quantity indicating characteristics of the thermal state of the machine controlled by the numerical control section 100 created by the feature quantity creating section 210 is information useful as a criterion for inferring a thermal displacement amount of the machine controlled by the numerical control section 100. In addition, the feature quantity indicating characteristics of the thermal state of the machine controlled by the numerical control section 100 created by the feature quantity creating section 210 is used as input data when an inferential calculation section 220 (to be described later) performs an inference using a learning model. The feature quantity indicating characteristics of the thermal state of the machine controlled by the numerical control section 100 created by the feature quantity creating section 210 may be, for example, a load on a spindle detected by the state quantity detecting section 140 which is sampled at prescribed sampling intervals during a prescribed period in the past or a peak value during a prescribed period in the past of a speed of the motor 120 detected by the state quantity detecting section 140. The feature quantity creating section 210 preprocesses and normalizes the state quantity detected by the state quantity detecting section 140 to enable the inferential calculation section 220 to handle the state quantity.

The inferential calculation section 220 provided in the inference processing section 200 infers a thermal displacement compensation amount of each axis of the machine controlled by the numerical control section 100 based on a learning model selected from the learning model storage section 300 based on a current condition of individual difference of the machine controlled by the numerical control section 100 and on the feature quantity created by the feature quantity creating section 210. The inferential calculation section 220 is implemented by applying a learning model stored in the learning model storage section 300 to a platform capable of executing inference processing by machine learning. The inferential calculation section 220 may be configured to, for example, perform inference processing using a multi-layered neural network or perform inference processing using a known learning algorithm for machine learning such as a Bayesian network, a support vector machine, or a Gaussian mixture model. The inferential calculation section 220 may be configured to, for example, perform inference processing using a learning algorithm such as supervised learning, unsupervised learning, or reinforcement learning. In addition, the inferential calculation section 220 may be capable of respectively executing inference processing based on a plurality of learning algorithms. The inferential calculation section 220 constitutes a machine learning device based on a learning model for machine learning selected from the learning model storage section 300 and infers a thermal displacement compensation amount of each axis of the machine controlled by the numerical control section 100 by executing inference processing using the feature quantity created by the feature quantity creating section 210 as input data of the machine learning device.

The learning model storage section 300 according to the present embodiment is capable of storing a plurality of learning models associated with a combination of conditions of individual difference of the machine controlled by the numerical control section 100 specified by the condition specifying section 110. The learning model storage section 300 can be implemented in, for example, the numerical control section 100, a cell computer, a host computer, a cloud server, or a database server.

The learning model storage section 300 stores a plurality of learning models 1, 2, . . . , N associated with a combination of conditions of individual difference of the machine controlled by the numerical control section 100 specified by the condition specifying section 110. A combination of conditions of individual difference of the machine controlled by the numerical control section 100 as described herein means a combination related to values that can be taken by each condition, a range of values of each condition, and an enumeration of values of each condition and, for example, conditions may be classified according to combinations of a range of a production lot, a range of a frequency of use, a range of a cumulative operating time, a range of maintenance history, and a range of modification history (such as a list of custom-ordered components that can be built into the machine) of the machine as shown in FIG. 3.

The learning model stored in the learning model storage section 300 is stored as information capable of constructing one learning model adaptable to inference processing in the inferential calculation section 220. The learning model stored in the learning model storage section 300 can be stored as the number of neurons (perceptrons) of each layer, a weight parameter between neurons (perceptrons) of each layer, and the like in the case of a learning model using a learning algorithm of a multi-layered neural network, and the learning model stored in the learning model storage section 300 can be stored as a transition probability between nodes constituting a Bayesian network in the case of a learning model using a learning model of a Bayesian network. Each of the learning models stored in the learning model storage section 300 may be a learning model using a same learning algorithm or a learning model using a different learning algorithm, and the learning models stored in the learning model storage section 300 may be a learning model using any kind of learning algorithm as long as the learning model can be used in inference processing by the inferential calculation section 220.

The learning model storage section 300 may store one learning model in association with a combination of conditions of individual difference of the machine controlled by one numerical control section 100 or may associate and store a learning model using two or more different learning algorithms with a combination of conditions of individual difference of the machine controlled by one numerical control section 100. The learning model storage section 300 may associate and store a learning model using a different learning algorithm with each of combinations having overlapping ranges of conditions of individual difference of the machine controlled by a plurality of numerical control sections 100. At this point, by further defining conditions of use such as a required throughput and a learning algorithm type with respect to the learning model corresponding to a combination of conditions of individual difference of the machine controlled by the numerical control section 100, for example, the learning model storage section 300 enables a learning model in accordance with the inferential calculation section 220 of which inference processing that can be executed and processing capacity differ from another inferential calculation section 220 to be selected with respect to a combination of conditions of individual difference of the machine controlled by the numerical control section 100.

When the learning model storage section 300 receives a read/write request of a learning model including a combination of conditions of individual difference of the machine controlled by the numerical control section 100 from the outside, the learning model storage section 300 performs read/write with respect to the learning model stored in association with the combination of conditions of individual difference of the machine controlled by the numerical control section 100. At this point, the read/write request for a learning model may Include information on inference processing that can be executed by the inferential calculation section 220 and processing capacity of the inferential calculation section 220 and, in such a case, the learning model storage section 300 performs read/write with respect to the learning model associated with the combination of conditions of individual difference of the machine controlled by the numerical control section 100 and with the inference processing that can be executed by the inferential calculation section 220 and processing capacity of the inferential calculation section 220. The learning model storage section 300 may be provided with a function which, in response to a read/write request of a learning model from the outside, causes read/write to be performed with respect to a learning model associated with (a combination of) conditions specified by the condition specifying section 110 based on the conditions Providing such a function eliminates the need to provide the inferential calculation section 220 or the learning model generating section 500 with a function for requesting a learning model based on conditions specified by the condition specifying section 110.

Moreover, the learning model storage section 300 may be configured to encrypt and store a learning model generated by the learning model generating section 500 and to decrypt the encrypted learning model when the learning model is read by the inferential calculation section 220.

The compensation executing section 400 performs a thermal displacement compensation of the machine controlled by the numerical control section 100 based on a thermal displacement compensation amount or each axis of the machine controlled by the numerical control section 100 inferred by the inference processing section 200. The compensation executing section 400 performs a thermal displacement compensation of the machine controlled by the numerical control section 100 by, for example, commanding a compensation amount of each axis to the numerical control section 100.

The learning model generating section 500 generates or updates (performs machine learning) a learning model stored in the learning model storage section 300 based on a condition of individual difference of the machine controlled by the numerical control section 100 specified by the condition specifying section 110 and a feature quantity indicating characteristics of a thermal state of the machine controlled by the numerical control section 100 created by the feature quantity creating section 210. The learning model generating section 500 selects a learning model to be an object of generation or update based on the condition of individual difference of the machine controlled by the numerical control section 100 specified by the condition specifying section 110 and, with respect to the selected learning model, performs machine learning according to the feature quantity indicating characteristics of a thermal state of the machine controlled by the numerical control section 100 created by the feature quantity creating section 210. The learning model generating section 500 performs learning when, for example, a worker manually sets a thermal displacement compensation amount of each axis of the machine with respect to the numerical control section 100 or when the thermal displacement compensation amount of each axis of the machine is set by other thermal displacement compensation means. In this case, when an operation of the machine based on the set thermal displacement compensation amount is normally performed (for example, when a worker verifies that a workpiece with prescribed accuracy has been machined), the learning model generating section 500 performs, with respect to a learning model selected based on the condition of individual difference of the machine controlled by the numerical control section 100, generation or update (machine learning) of the learning model using the feature quantity indicating characteristics of a thermal state of the machine controlled by the numerical control section 100 created by the feature quantity creating section 210 as a state variable and a set thermal displacement compensation amount of each axis as labeled data.

When a learning model associated with (a combination of) conditions of individual difference of the machine controlled by the numerical control section 100 specified by the condition specifying section 110 is not stored in the learning model storage section 300, the learning model generating section 500 newly generates a learning model associated with (the combination of) conditions, but when a learning model associated with (a combination of) conditions of individual difference of the machine controlled by the numerical control section 100 specified by the condition specifying section 110 is stored in the learning model storage section 300, the learning model generating section 500 updates the learning model by performing machine learning with respect to the learning model. When a plurality of learning models associated with (a combination of) conditions of individual difference of the machine controlled by the numerical control section 100 specified by the condition specifying section 110 are stored in the learning model storage section 300, the learning model generating section 500 may perform machine learning with respect to each of the learning models or may perform machine learning only with respect to a part of the learning models based on a learning process that can be executed by the learning model generating section 500 or processing capacity of the learning model generating section 500.

The learning model generating section 500 may modify a learning model stored in the learning model storage section 300 to generate a new learning model. Examples of a modification of a learning model by the learning model generating section 500 include generation of a distilled model. A distilled model refers to a learned model obtained by performing learning from scratch in another machine learning device using an output in response to an input to a machine learning device with a built-in learned model. The learning model generating section 500 is capable of storing a distilled model obtained through such a process (referred to as a distillation process) as a new learning model in the learning model storage section 300 and utilizing the distilled model. Generally, since a distill ed model is capable of producing a degree of accuracy comparable to that of an original learned model despite having smaller size than the original learned model, a distilled model is better suited for distribution to other computers via a network and the like. Other examples of a modification of a learning model by the learning model generating section 500 include integration of learning models. When structures of two or more learning models stored in association with (a combination of) conditions of individual difference of the machine controlled by the numerical control section 100 are similar to each other and when, for example, a value of each weight parameter is within a prescribed threshold set in advance, the learning model generating section 500 may first integrate (combinations of) conditions of individual difference of the machine controlled by the numerical control section 100 associated with the learning models and then store any of the two or more learning models with similar structures in association with the integrated (combinations of) conditions.

Figure 4:
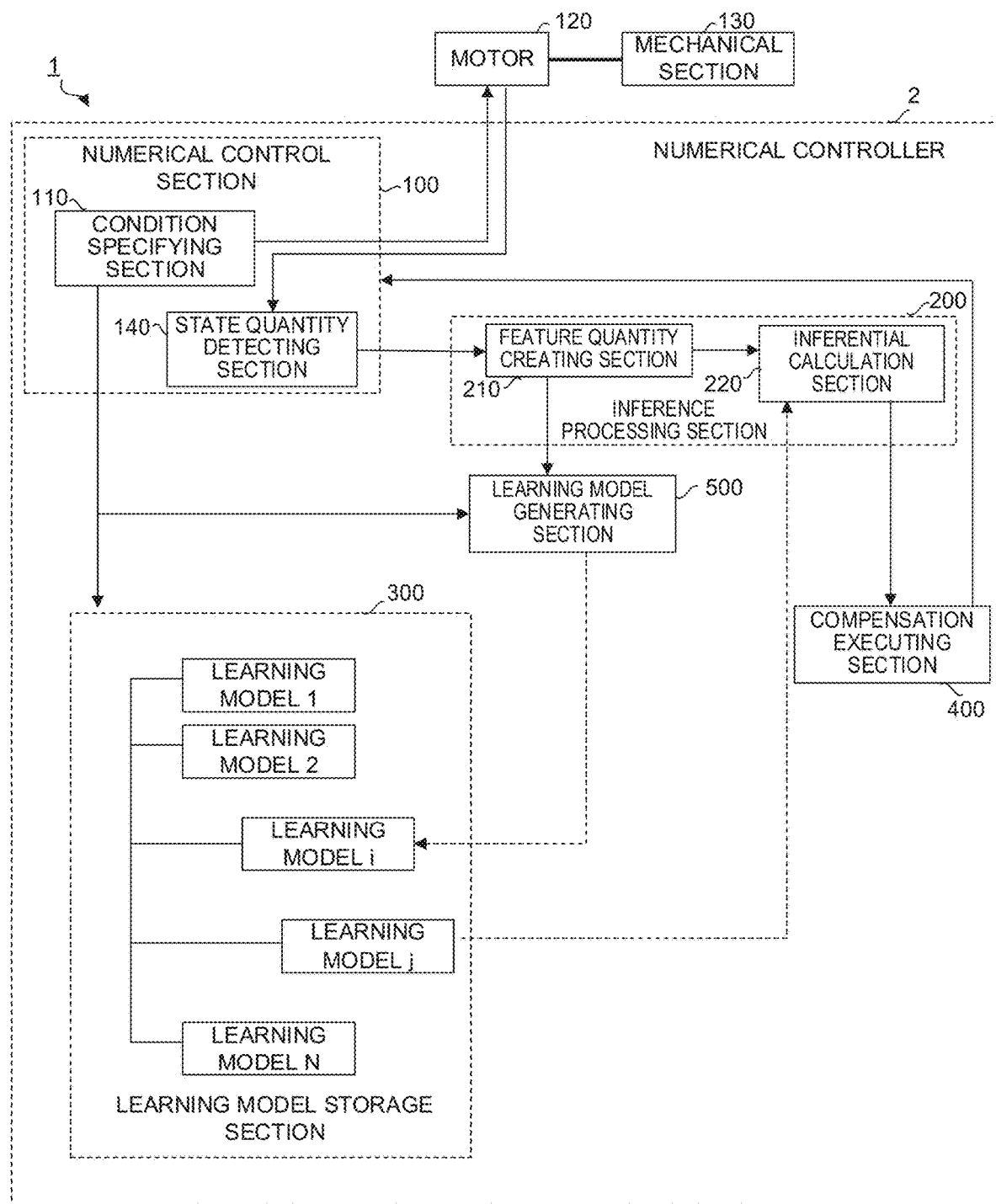
FIG. 4 is a schematic functional block diagram of a thermal displacement compensation system according to a second embodiment.

FIG. 4 is a schematic functional block diagram of the thermal displacement compensation system 1 according to a second embodiment.

In the thermal displacement compensation system 1 according to the present embodiment, each functional block is mounted to a single numerical controller 2. By adopting such a configuration, the thermal displacement compensation system 1 according to the present embodiment infers a thermal displacement compensation amount of each axis of the machine controlled by the numerical control section 100 using a different learning model in accordance with individual difference of a machine controlled by the numerical controller 2, and performs a thermal displacement compensation of each axis of the machine based on a result of the inference. In addition, each learning model in accordance with a condition of individual difference of the machine controlled by the numerical control section 100 can be generated/updated by one numerical controller 2.

Figure 5:
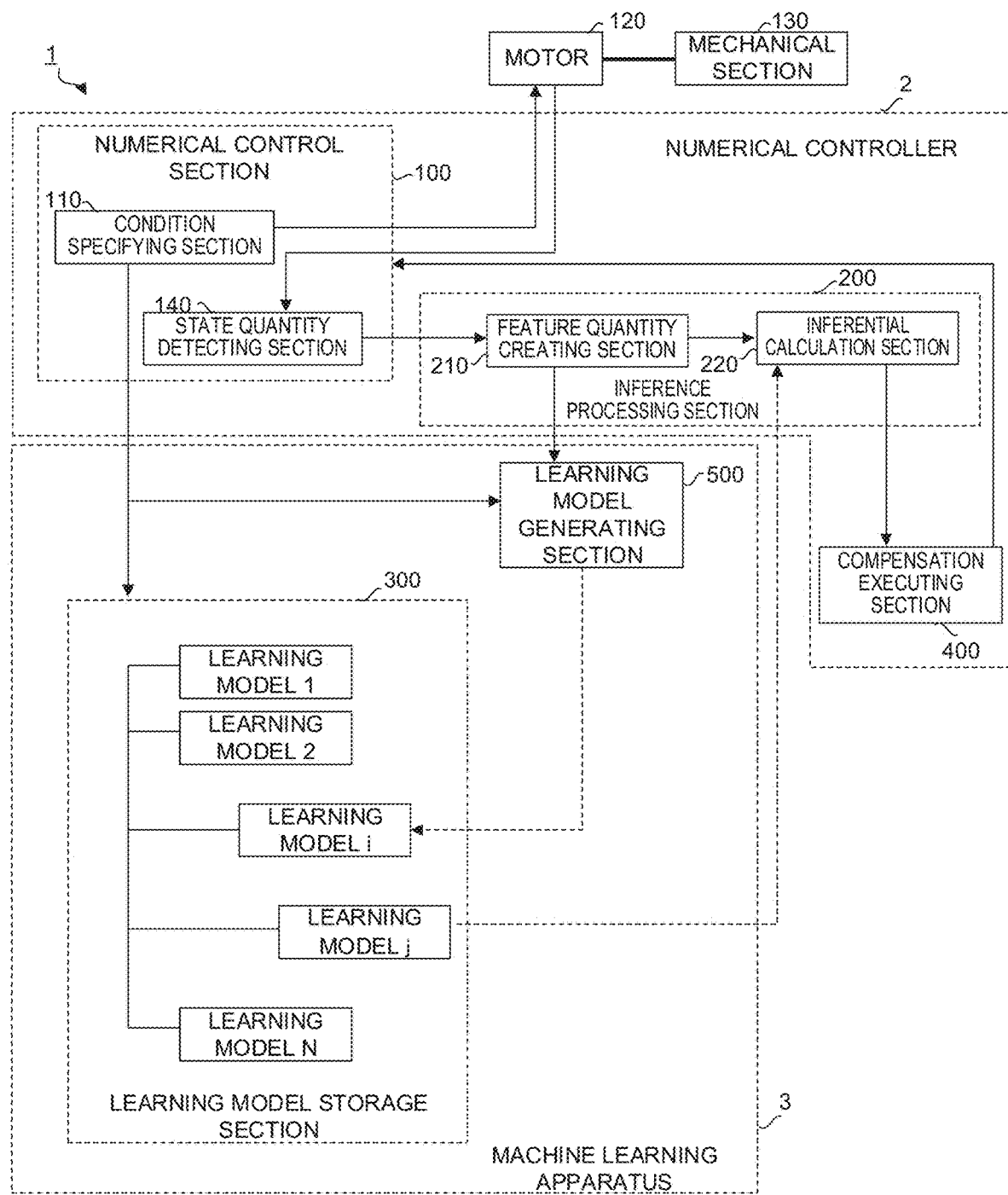
FIG. 5 is a schematic functional block diagram of a thermal displacement compensation system according to a third embodiment.

FIG. 5 is a schematic functional block diagram of the thermal displacement compensation system 1 according to a third embodiment.

In the thermal displacement compensation system 1 according to the present embodiment, the numerical control section 100, the inference processing section 200, and the compensation executing section 400 are mounted on the numerical controller 2, and the learning model storage section 300 and the learning model generating section 500 are mounted on a machine learning apparatus 3 connected to the numerical controller 2 via a standard interface or network. The machine learning apparatus 3 may be mounted on a cell computer, a host computer, a cloud server, or a database server. By adopting such a configuration, since inference processing using a learned model which is relatively light processing can be executed on the numerical controller 2 and generation/update processing of a learning model which is relatively heavy processing can be executed on the machine learning apparatus 3, operations of the thermal displacement compensation system 1 can be performed without interfering with intrinsic operations of the numerical controller 2.

Figure 6:
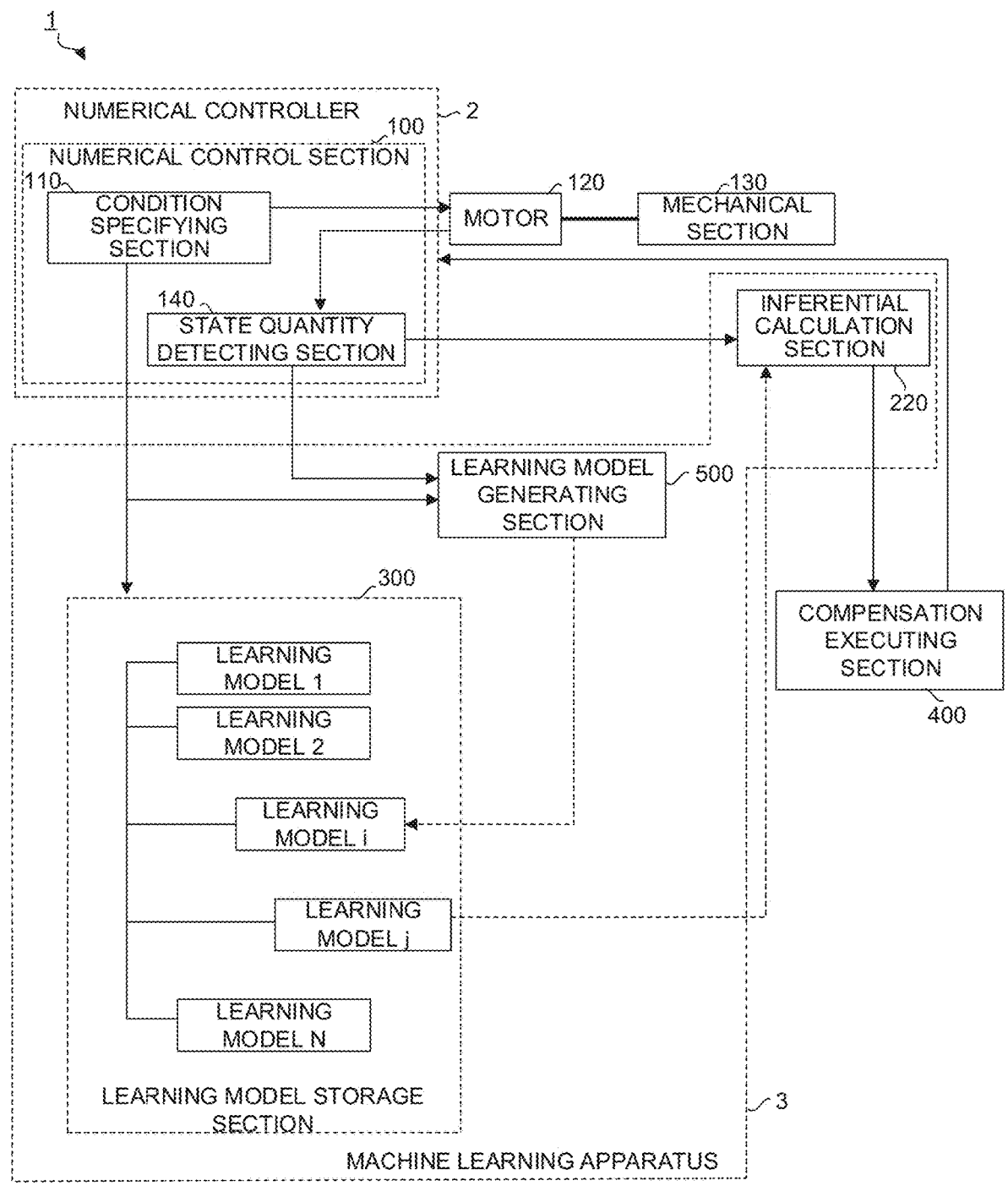
FIG. 6 is a schematic functional block diagram of a thermal displacement compensation system according to a fourth embodiment.

FIG. 6 is a schematic functional block diagram of the thermal displacement compensation system 1 according to a fourth embodiment.

In the thermal displacement compensation system 1 according to the present embodiment, the numerical control section 100 is mounted on the numerical controller 2, and the inferential calculation section 220, the learning model storage section 300, and the learning model generating section 500 are mounted on the machine learning apparatus 3 connected to the numerical controller 2 via a standard interface or network. In addition, the compensation executing section 400 is separately provided. Moreover, in the thermal displacement compensation system 1 according to the present embodiment, the configuration of the feature quantity creating section 210 is omitted on the assumption that a state quantity detected by the state quantity detecting section 140 is data that can be used without modification in inference processing by the inferential calculation section 220 and generation/update processing of a learning mode by the learning model generating section 500. By adopting such a configuration, since inference processing using a learned model and generation/update processing of a learning model can be executed on the machine learning apparatus 3 operations of the thermal displacement compensation system 1 can be performed without interfering with intrinsic operations of the numerical controller 2.

Figure 7:
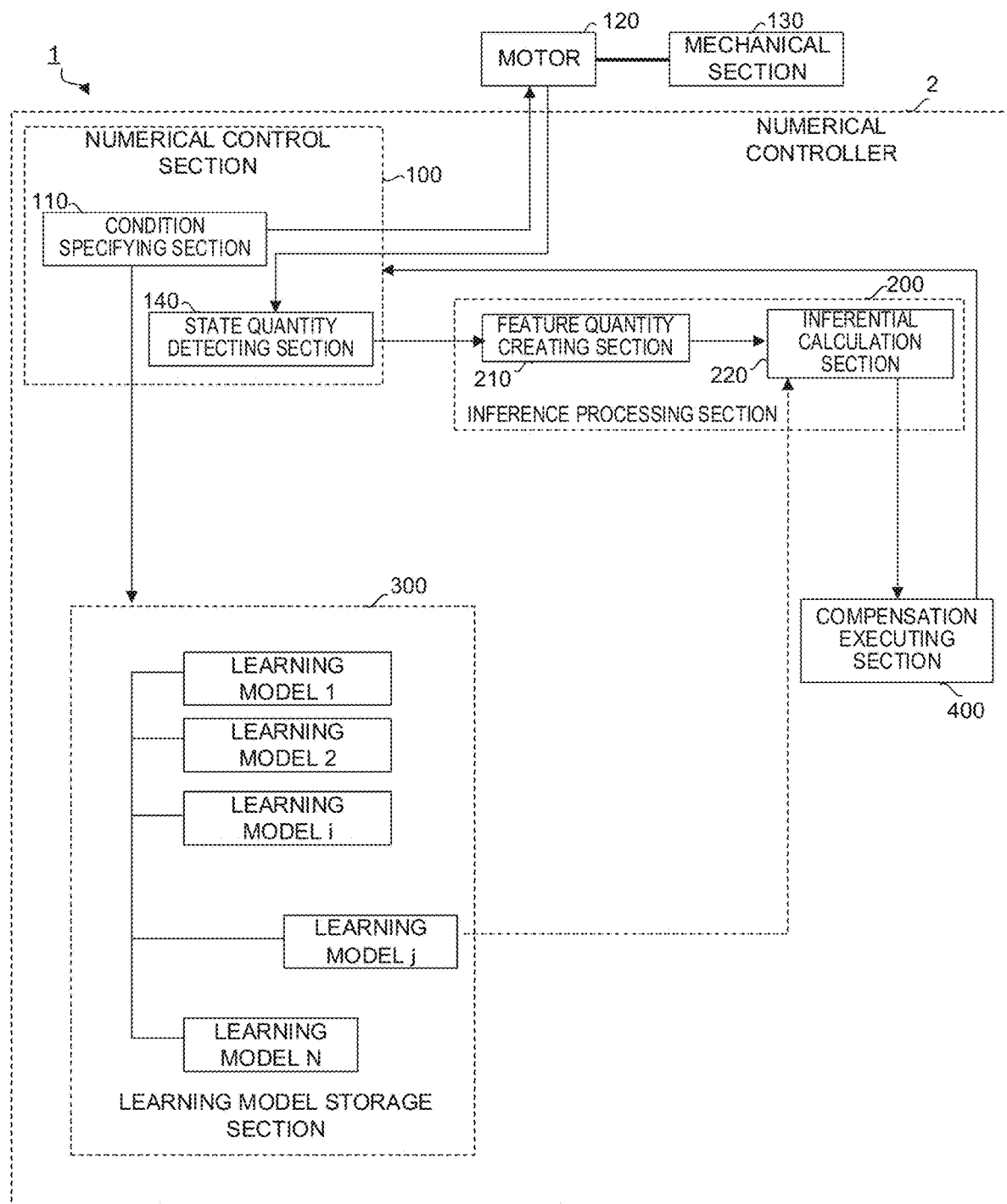
FIG. 7 is a schematic functional block diagram of a thermal displacement compensation system according to a fifth embodiment.

FIG. 7 is a schematic functional block diagram of the thermal displacement compensation system 1 according to a fifth embodiment.

In the thermal displacement compensation system 1 according to the present embodiment, each functional block is mounted to a single numerical controller 2. Moreover, in the thermal displacement compensation system 1 according to the present embodiment, a plurality of learned learning models associated with combinations of conditions of individual difference of the machine controlled by the numerical control section 100 are already stored in the learning model storage section 300, and the configuration of the learning model generating section 500 is omitted on the assumption that generation/update of learning models is not performed. By adopting such a configuration, the thermal displacement compensation system 1 according to the present embodiment infers a thermal displacement compensation amount of each axis of the machine controlled by the numerical control section 100 using a different learning model in accordance with, for example, individual difference of a machine controlled by the numerical controller 2, and performs a thermal displacement compensation of each axis of the machine based on a result of the inference. In addition, since arbitrary updating of a learning model is not performed, for example, the configuration described above may be adopted as a configuration of the numerical controller 2 to be shipped to a client.

Figure 8:
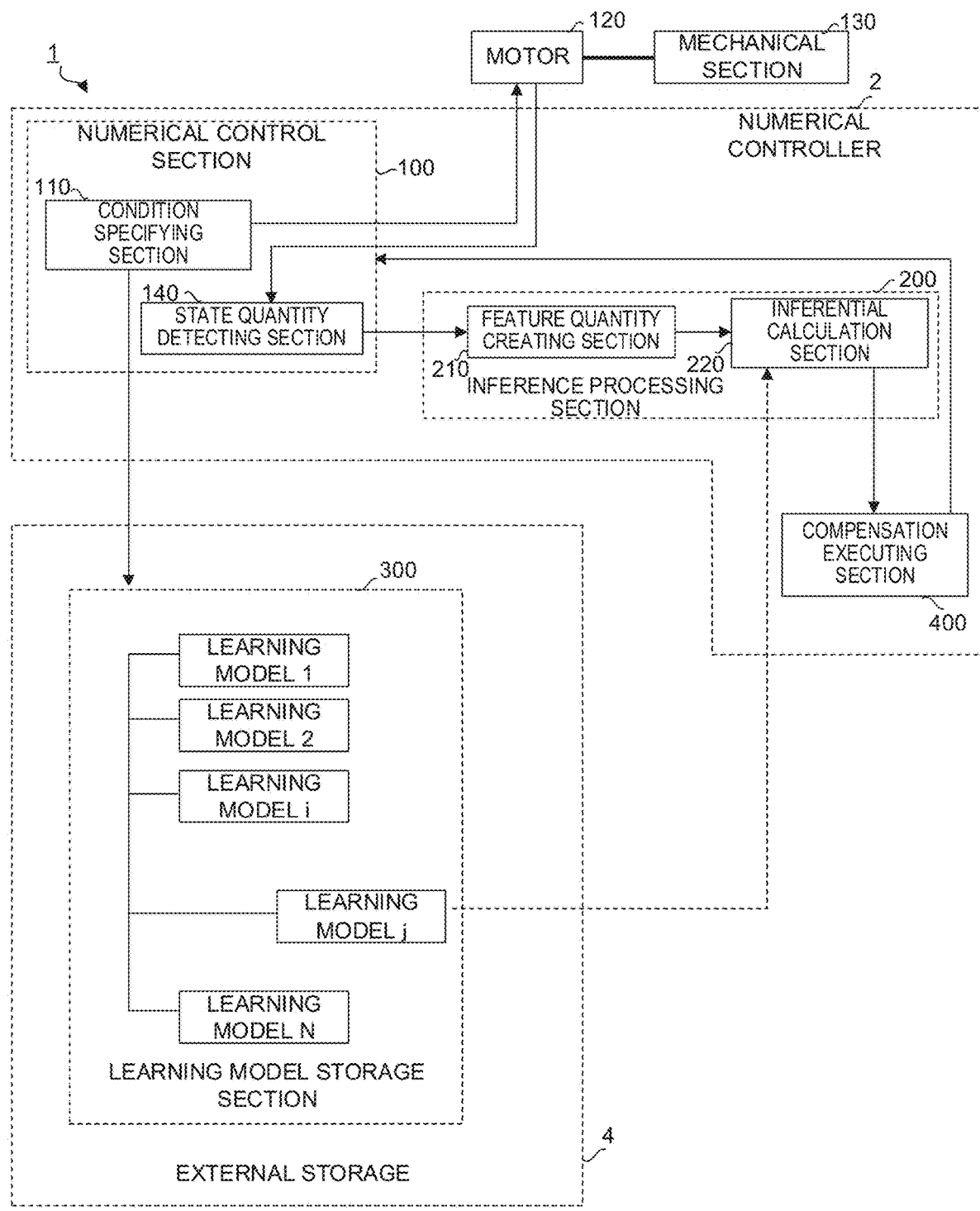
FIG. 8 is a schematic functional block diagram of a modification of the thermal displacement compensation system according to the fifth embodiment.

FIG. 8 is a schematic functional block diagram of a modification of the thermal displacement compensation system 1 (FIG. 7) according to the fifth embodiment.

The thermal displacement compensation system 1 according to the present embodiment represents an example in which the learning model storage section 300 according to the fifth embodiment (FIG. 7) is mounted to an external storage 4 connected to the numerical controller 2.

In the present modification, since storing learning models with large capacities in the external storage 4 enables a large number of learning models to be used and, at the same time, enables learning models to be read without involving a network and the like, the present modification is effective when inference processing is to be performed in real time.

Figure 9:
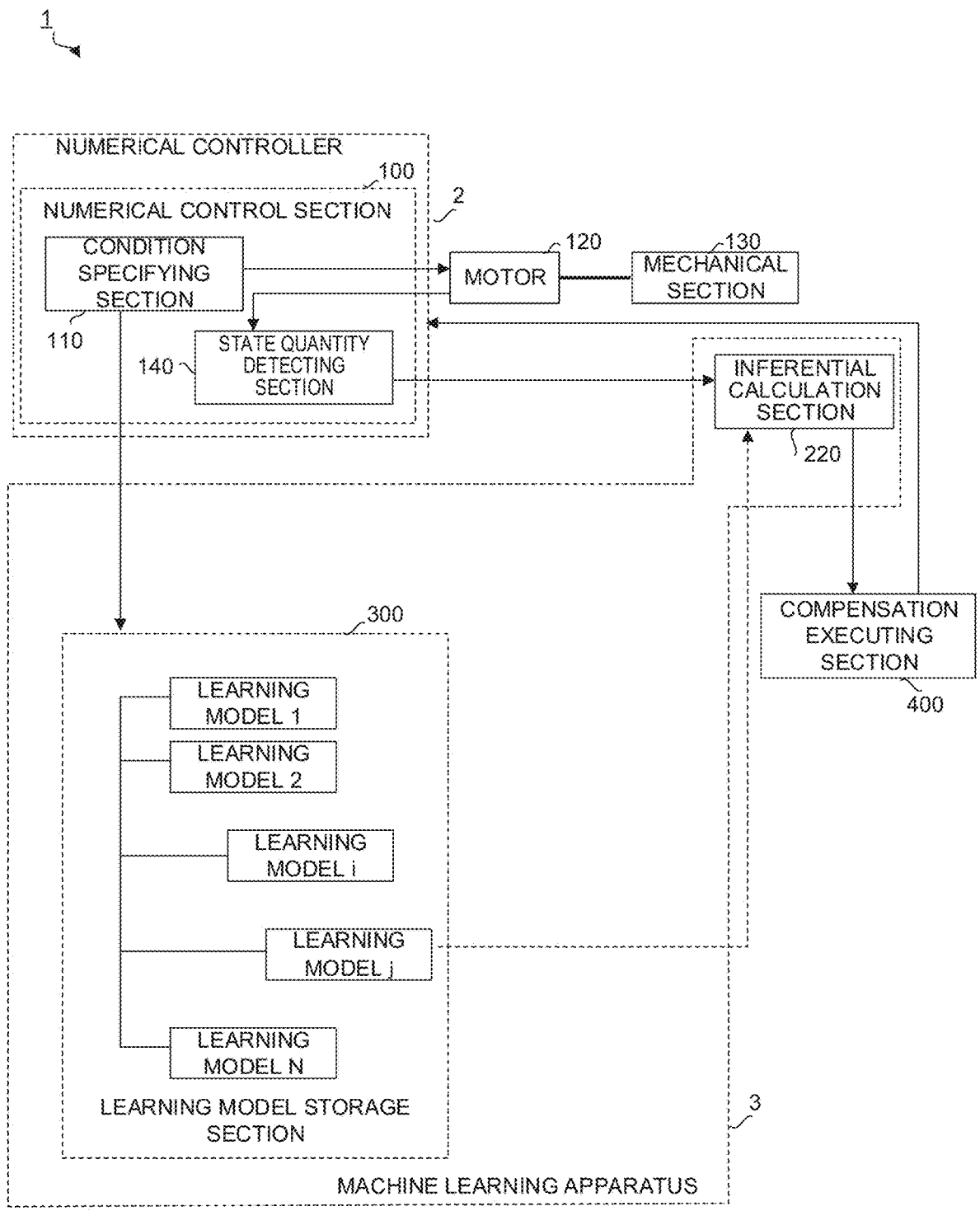
FIG. 9 is a schematic functional block diagram of a thermal displacement compensation system according to a sixth embodiment.

FIG. 9 is a schematic functional block diagram of the thermal displacement compensation system 1 according to a sixth embodiment.

In the thermal displacement compensation system 1 according to the present embodiment, the numerical control section 100 is mounted on the numerical controller 2, and the inferential calculation section 220 and the learning model storage section 300 are mounted on the machine learning apparatus 3 connected to the numerical controller 2 via a standard interface or network. The machine learning apparatus 3 may be mounted on a cell computer, a host computer, a cloud server, or a database server. Moreover, in the thermal displacement compensation system 1 according to the present embodiment, a plurality of learned learning models associated with combinations of conditions of individual difference of the machine controlled by the numerical control section 100 are already stored in the learning model storage section 300, and the configuration of the learning model generating section 500 is omitted on the assumption that generation/update of learning models is not performed. In addition, in the thermal displacement compensation system 1 according to the present embodiment, the configuration of the feature quantity creating section 210 is omitted on the assumption that a state quantity detected by the state quantity detecting section 140 is data that can be used without modification in inference processing by the inferential calculation section 220. By adopting such a configuration, for example, the thermal displacement compensation system 1 according to the present embodiment infers a thermal displacement compensation amount of each axis of the machine controlled by the numerical control section 100 using a different learning model in accordance with, for example, individual difference of a machine controlled by the numerical controller 2, and performs a thermal displacement compensation of each axis of the machine based on a result of the inference. In addition, since arbitrary updating of a learning model is not performed, for example, the configuration described above may be adopted as a configuration of the numerical controller 2 to be shipped to a client.

Figure 10:
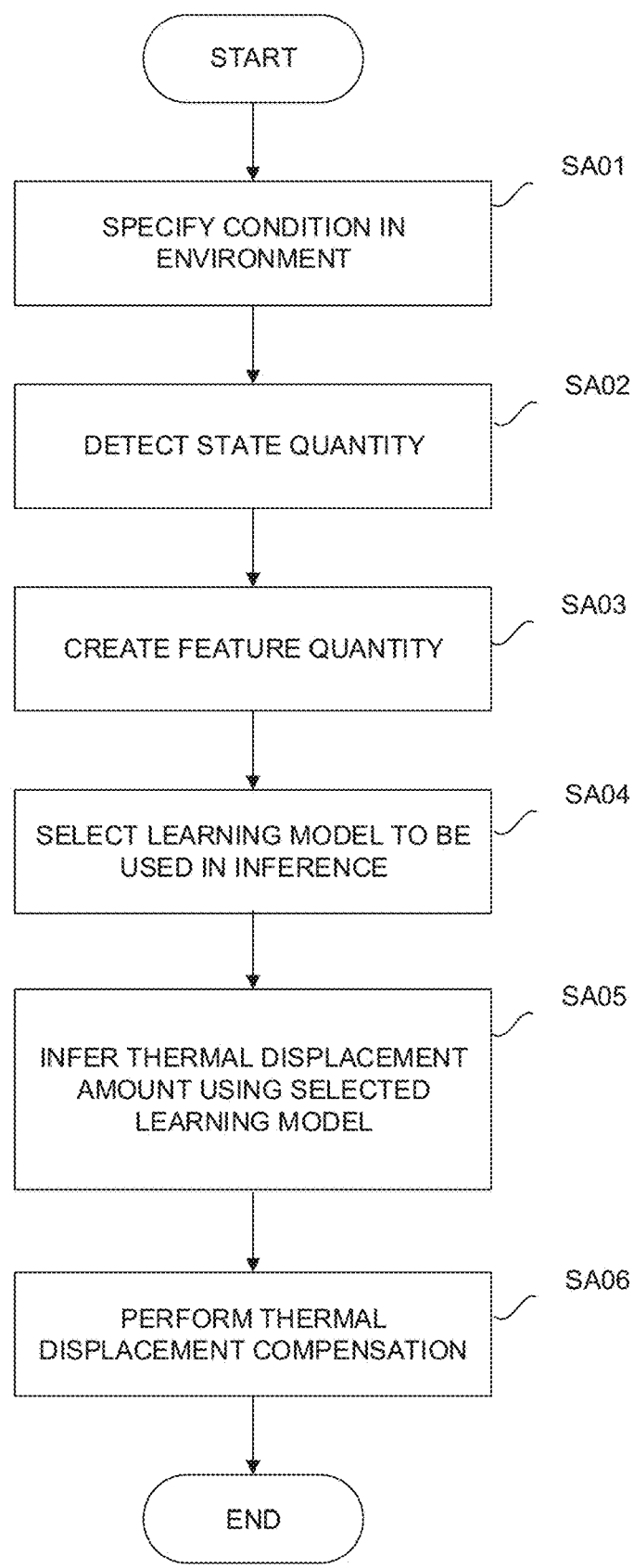
FIG. 10 is a schematic flow chart of processing executed on a thermal displacement compensation system according to the present invention.

FIG. 10 is a schematic flow chart of processing executed by the thermal displacement compensation system 1 according to the present invention.

The flow chart shown in FIG. 10 illustrates a flow of processing in case where an update of a learning model in the thermal displacement compensation system 1 is not performed (fifth and sixth embodiments).

[Step SA01] The condition specifying section 110 specifies a condition of individual difference of the machine controlled by the numerical control section 100.

[Step SA02] The state quantity detecting section 140 detects a state of the machine controlled by the numerical control section 100 as a state quantity.

[Step SA03] The feature quantity creating section 210 creates a feature quantity indicating characteristics of a thermal state of the machine controlled by the numerical control section 100 based on the state quantity detected in step SA02.

[Step SA04] The inferential calculation section 220 selects and reads a learning model corresponding to the condition of individual difference of the machine controlled by the numerical control section 100 specified in step SA01 from the learning model storage section 300 as a learning model to be used for inference.

[Step SA05] The inferential calculation section 220 infers a thermal displacement compensation amount of each axis of the machine controlled by the numerical control section 100 based on the learning model read in step SA04 and the feature quantity created in step SA03.

[Step SA06] The compensation executing section 400 performs a thermal displacement compensation based on the thermal displacement compensation amount of each axis of the machine inferred in step SA05.

Figure 11:
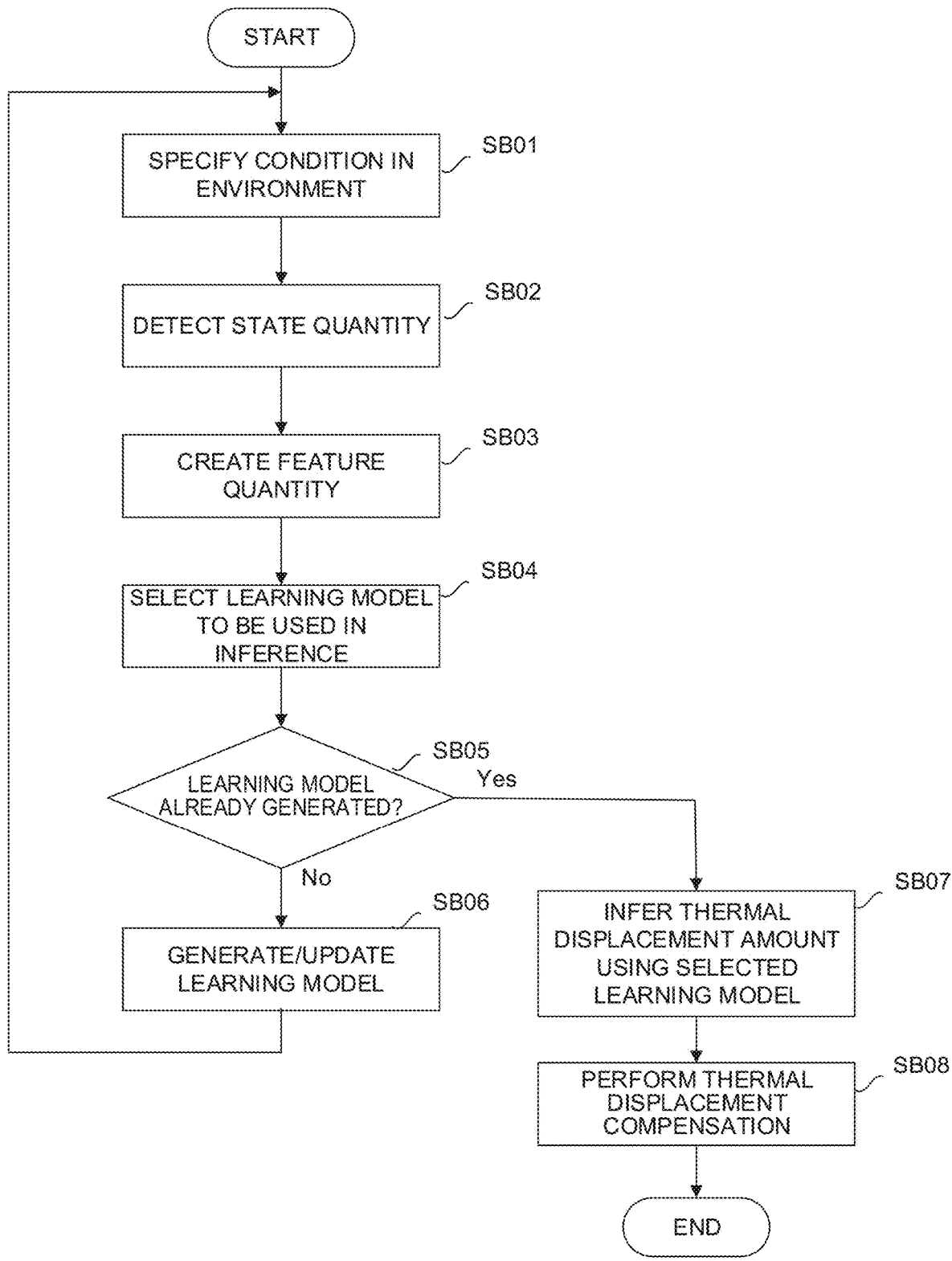
FIG. 11 is a schematic flow chart of processing executed on a thermal displacement compensation system according to the present invention.

FIG. 11 is a schematic flow chart of processing executed by the thermal displacement compensation system 1 according to the present invention.

The flow chart shown in FIG. 11 illustrates a flow of processing in case where generation/update of a learning model in the thermal displacement compensation system 1 is performed (first to fourth embodiments).

[Step SB01] The condition specifying section 110 specifies a condition of individual difference of the machine controlled by the numerical_control section 100.

[Step SB02] The state quantity detecting section 140 detects a state of the machine controlled by the numerical control section 100 as a state quantity.

[Step SB03] The feature quantity creating section 210 creates a feature quantity indicating characteristics of a thermal state of the machine controlled by the numerical control section 100 based on the state quantity detected in step SB02.

[Step SB04] The inferential calculation section 220 selects and reads a learning model corresponding to the condition of individual difference of the machine controlled by the numerical control section 100 specified in step SB01 from the learning model storage section 300 as a learning model to be used for inference.

[Step SB05] The learning model generating section 500 determines whether or not a learned learning model corresponding to the condition of individual difference of the machine controlled by the numerical control section 100 specified in step SB01 has been generated in the learning model storage section 300. When a learned learning model has been generated, the processing proceeds to step SB07, but when a learned learning model has not been generated, the processing proceeds to step SB06.

[Step SB06] The learning model generating section 500 generates/updates the learning model corresponding to the condition of individual difference of the machine controlled by the numerical control section 100 specified in step SB01 based on the feature quantity created in step SB03, and the processing proceeds to step SB01.

[Step SB07] The inferential calculation section 220 infers a thermal displacement compensation amount of each axis of the machine controlled by the numerical control section 100 based on the learning model read in step SB04 and the feature quantity created in step SB03.

[Step SB08] The compensation executing section 400 performs a thermal displacement compensation based on the thermal displacement compensation amount of each axis of the machine inferred in step SB07.

Figure 12:
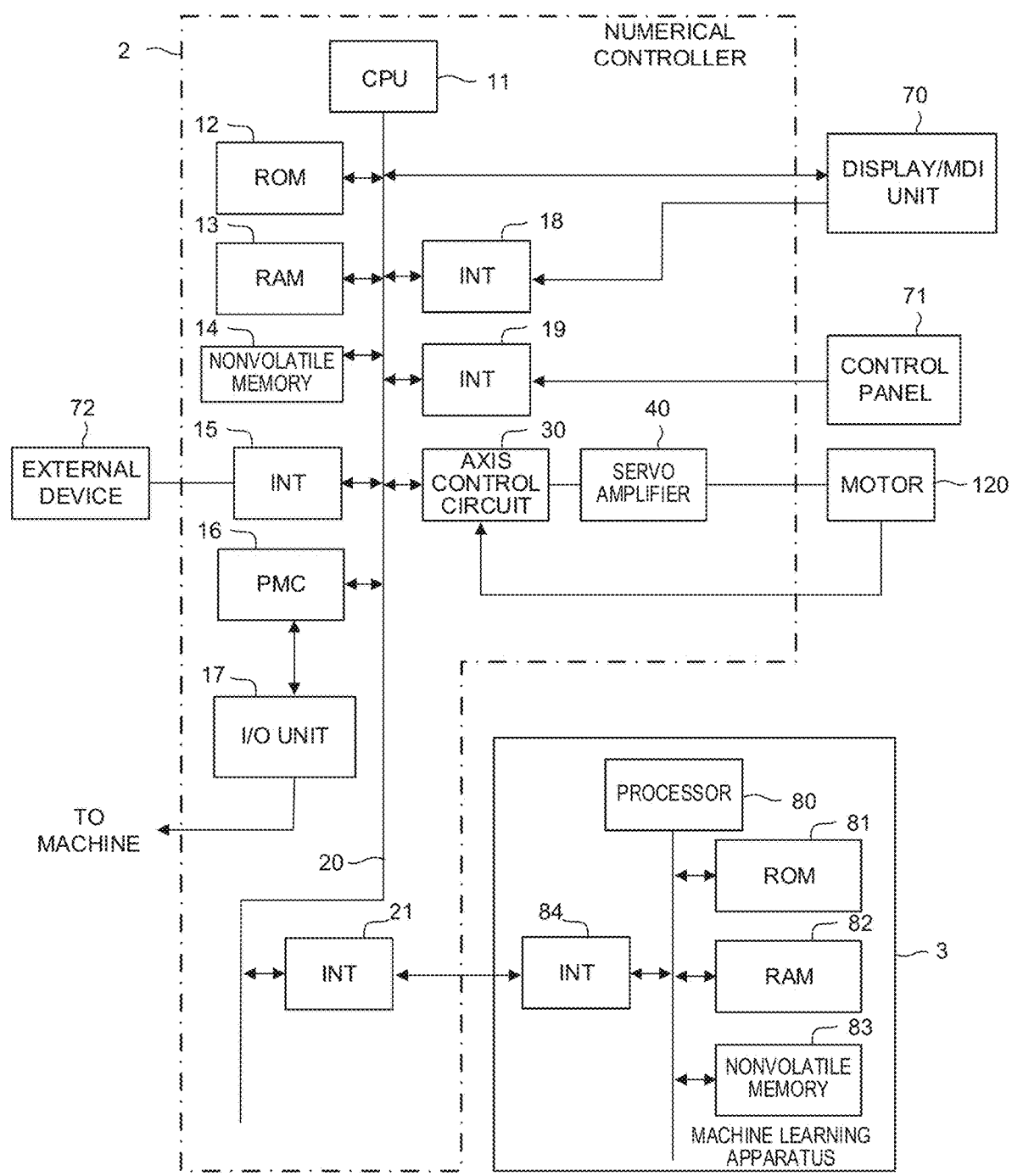
FIG. 12 is a schematic hardware configuration diagram showing main parts of a numerical controller and a machine learning apparatus according to an embodiment of the present invention.

FIG. 12 is a schematic hardware configuration diagram showing main parts of a numerical controller and a machine learning apparatus according to an embodiment of the present invention.

A CPU 11 provided in the numerical controller 2 according to the present embodiment is a processor which controls the entire numerical controller 2. The CPU 11 reads a system program stored in a ROM 12 via a bus 20, and controls the entire numerical controller 2 in accordance with the system program. A RAM 13 temporarily stores temporary calculation data and display data, various data input by an operator via an input section (not shown), and the like.

A nonvolatile memory 14 is configured as a memory of which a storage state is retained even when a power supply of the numerical controller 2 is turned off by being backed up with a battery (not shown) or the like. The nonvolatile memory 14 stores a work program read via an interface 15, a work program input via a display/MDI unit 70 (to be described later), and the like. The work program related to repetitive the control stored in the nonvolatile memory 14 may be deployed on the RAM 13 during use. In addition, various system programs (including a system program for controlling communication with the machine learning apparatus 3 to be described later) necessary for operations of the numerical controller 2 are written in the ROM 12 in advance.

The interface 15 is an interface for connecting the numerical controller 2 with an external device 72 such as an adapter. Work programs, various parameters, and the like are read from the external device 72. In addition, the program related to repetitive control, various parameters, and the like edited in the numerical controller 2 can be stored in external storage means via the external device 72. A programmable machine controller (PMC) 16 outputs signal via an I/O unit 17 to peripheral apparatuses (for example, an actuator such as a robot hand for tool change) of a machine tool to control the peripheral apparatuses with a sequence program built into the numerical controller 2. In addition, the programmable machine controller 16 receives signals from various switches on a control panel and sensors arranged in a main body of the machine tool and, after performing necessary signal processing, hands over the processed signals to the CPU 11.

The display/MDI unit 70 is a manual data input device provided with a display, a keyboard, and the like, and an interface 18 receives commands and data from the keyboard of the display/MDI unit 70 and hands over the commands and data to the CPU 11. An interface 19 is connected to a control panel 71 provided with a manual pulse generator and the like to be used when manually driving each axis.

The display/MDI unit 70 is also capable of displaying an immediate value and a history of inferential evaluation values that represent a thermal displacement state of a machine. While a final result can be obtained by various methods such as a threshold discrimination method, a trend graph determination method, and an outlier detection method in embodiments of the proposed system, by visualizing a part of a process in which the result is obtained, a result consistent with industrial intuition of a worker actually operating a machine tool at a production side can be provided.

Upon receiving a movement command amount of an axis from the CPU 11, an axis control circuit 30 for controlling an axis provided in the machine tool outputs an axis command to a servo amplifier 40. The servo amplifier 40 receives the command and drives the motor 120 which moves an axis provided in the machine tool. The motor 120 of the axis has a built-in position; speed detector and performs position/speed feedback control by feeding back a position/speed feedback signal from the position/speed detector to the axis control circuit 30. While the hardware configuration diagram in FIG. 12 only shows one each of the axis control circuit 30, the servo amplifier 40, and the motor 120, in reality, as many components as the number of axes provided in the machine tool that is a control object are to be prepared.

An interface 21 is an interface for connecting the numerical controller 2 and the machine learning apparatus 3 with each other. The machine learning apparatus 3 is provided with a processor 80 which controls the entire machine learning apparatus 3, a ROM 81 which stores a system program and the like, a RAM 82 which performs temporarily storage during each process related to machine learning, and a nonvolatile memory 83 which stores learning models and the like. The machine learning apparatus 3 exchanges various pieces of data with the numerical controller 2 via an interface 84 and the interface 21.

While embodiments of the present invention have been described above, it is to be understood that the present invention is not limited to the examples presented in the embodiments and may be variously embodied by making suitable modifications thereto.

The invention claimed is:

1. A thermal displacement compensation system for performing a thermal displacement compensation of a machine, the thermal displacement compensation system comprising:
a processor configured to
specify a condition of individual difference of the machine,
detect a state quantity indicating a state of the machine,
infer a thermal displacement compensation amount of the machine from the state quantity,
perform the thermal displacement compensation of the machine based on the thermal displacement compensation amount of the machine, and
generate or update at least one learning model among a plurality of learning models by machine learning that uses the state quantity under the condition of individual difference of the machine; and
a memory configured to store the plurality of learning models, including the at least one learning model generated or updated by the processor, in association with a combination of conditions including the condition of individual difference of the machine, wherein
the processor is configured to
among the plurality of learning models stored in the memory, switch to a learning model corresponding to the condition of individual difference of the machine, and
infer the thermal displacement compensation amount of the machine by selectively using, among the plurality of learning models stored in the memory, the learning model corresponding to the condition of individual difference of the machine,
the condition of individual difference of the machine includes a production lot, a frequency of use, or a maintenance history, and
the individual difference includes a difference of the machine compared to other machines controlled by the processor.

2. The thermal displacement compensation system according to claim 1, wherein
the processor is configured to
create a feature quantity characterizing a thermal state of the machine, from the state quantity,
infer the thermal displacement compensation amount of the machine from the feature quantity, and
generate or update the at least one learning model by machine learning that uses the feature quantity.

3. The thermal displacement compensation system according to claim 1, wherein
the at least one learning model comprises a new learning model, and
the processor is configured to generate the new learning model by performing a modification of an existing learning model of the plurality of learning models stored in the memory.

4. The thermal displacement compensation system according to claim 1, wherein
the processor is configured to
encrypt the plurality of learning models for storing the plurality of learning models in the memory, and
decrypt the encrypted learning model corresponding to the condition of individual difference of the machine for reading and using the learning model corresponding to the condition of individual difference of the machine to infer the thermal displacement compensation amount of the machine.

5. A thermal displacement compensation system for performing a thermal displacement compensation of a machine, the thermal displacement compensation system comprising:
a processor configured to
specify a condition of individual difference of the machine,
detect a state quantity indicating a state of the machine,
infer a thermal displacement compensation amount of the machine from the state quantity, and
perform a thermal displacement compensation of the machine based on the thermal displacement compensation amount of the machine; and
a memory configured to store a plurality of learning models associated in advance with a combination of conditions including the condition of individual difference of the machine,
wherein
the processor is configured to among the plurality of learning models stored in the memory, switch to a learning model corresponding to the condition of individual difference of the machine, and infer the thermal displacement compensation amount of the machine by selectively using, among the plurality of learning models stored in the memory, the learning model corresponding to the condition of individual difference of the machine, the condition of individual difference of the machine includes a production lot, a frequency of use, or a maintenance history, and the individual difference includes a difference of the machine compared to other machines controlled by the processor.

6. The thermal displacement compensation system according to claim 5, wherein the processor is configured to create a feature quantity characterizing a thermal state of the machine, from the state quantity, and infer the thermal displacement compensation amount of the machine from the feature quantity.

7. A thermal displacement compensation method, comprising:

specifying a condition of individual difference of a machine;

detecting a state quantity indicating a state of the machine;

inferring a thermal displacement compensation amount of the machine from the state quantity;

performing a thermal displacement compensation of the machine based on the thermal displacement compensation amount; and generating or updating at least one learning model among a plurality of learning models by machine learning that uses the state quantity under the condition of individual difference of the machine, wherein the inferring comprises:

among the plurality of learning models associated in advance with a combination of conditions including the condition of individual difference of the machine, switching to a learning model corresponding to the condition of individual difference of the machine, and using the learning model corresponding to the condition of individual difference of the machine to infer the thermal displacement compensation amount of the machine, the condition of individual difference of the machine includes a production lot, a frequency of use, or a maintenance history, and the individual difference includes a difference of the machine compared to other machines controlled by the processor.

8. The thermal displacement compensation method according to claim 7, further comprising:

creating a feature quantity characterizing a thermal state of the machine, from the state quantity, wherein in the inferring, the thermal displacement compensation amount of the machine is inferred from the feature quantity, and in the generating or updating, the at least one learning model is generated or updated by machine learning that uses the feature quantity.

9. A thermal displacement compensation method, comprising:

specifying a condition of individual difference of a machine;

detecting a state quantity indicating a state of the machine;

inferring a thermal displacement compensation amount of the machine from the state quantity; and performing a thermal displacement compensation of the machine based on the thermal displacement compensation amount, wherein the inferring comprises:

among a plurality of learning models associated in advance with a combination of conditions including the condition of individual difference of the machine, switching to a learning model corresponding to the condition of individual difference of the machine, and using the learning model corresponding to the condition of individual difference of the machine to infer the thermal displacement compensation amount of the machine, the condition of individual difference of the machine includes a production lot, a frequency of use, or a maintenance history, and the individual difference includes a difference of the machine compared to other machines controlled by the processor.

10. The thermal displacement compensation method according to claim 9, further comprising:

creating a feature quantity characterizing a thermal state of the machine, from the state quantity, wherein in the inferring, the thermal displacement compensation amount of the machine is inferred from the feature quantity.

11. The thermal displacement compensation system according to claim 1, wherein the plurality of learning models includes another learning model using two or more different learning algorithms in association with the combination of conditions.

12. The thermal displacement compensation system according to claim 5, wherein the plurality of learning models includes another learning model using two or more different learning algorithms in association with the combination of conditions.

13. The thermal displacement compensation method according to claim 7, wherein the plurality of learning models includes another learning model using two or more different learning algorithms in association with the combination of conditions.

14. The thermal displacement compensation method according to claim 9, wherein the plurality of learning models includes another learning model using two or more different learning algorithms in association with the combination of conditions.

* * * * *